United States Patent [19]

Tommerup

[11] 3,755,896
[45] Sept. 4, 1973

[54] PRUNING TOOL
[76] Inventor: Carl C. H. Tommerup, Guldbjerg 5400 Bogense, Denmark
[22] Filed: June 9, 1971
[21] Appl. No.: 151,376

[52] U.S. Cl. .................................. 30/372, 83/743
[51] Int. Cl. ...................... B27b 21/00, B27b 11/04
[58] Field of Search ..................... 30/124, 144, 166, 30/372, 296; 143/61, 68 R, 68 E; 83/743, 744, 745

[56] References Cited
UNITED STATES PATENTS

| | | | |
|---|---|---|---|
| 1,137,286 | 4/1915 | Ronconi | 30/166 |
| 1,492,721 | 5/1924 | Barrett | 30/166 |
| 2,273,329 | 2/1942 | Potter | 30/166 |
| 2,881,519 | 4/1959 | Gardner | 30/166 |
| 3,181,239 | 5/1965 | Skok | 30/166 |
| 1,224,194 | 5/1917 | Miller | 30/166 |

Primary Examiner—James L. Jones, Jr.
Attorney—Bosworth, Sessions, Herrstrom & Cain

[57] ABSTRACT

A pruning tool adapted to be used for cutting through branches of trees or shrubs at a distance from the operator. The tool comprises a pole of substantial length, one end of which is held by the operator who operates the tool. At the other end is a reciprocable cutting saw, and a vise for grasping the branch to be cut. The vise is tiltable with respect to the cutting tool so as to position the branch properly relative to the cutting tool as cutting progresses. Both the vise and the cutting tool are operated from the end of the pole held by the operator. The saw can be operated manually or by power means.

8 Claims, 10 Drawing Figures

Patented Sept. 4, 1973

INVENTOR.
CARL C. H. TOMMERUP
BY Bosworth, Sessions,
Herrstrom & Cain
ATTORNEYS

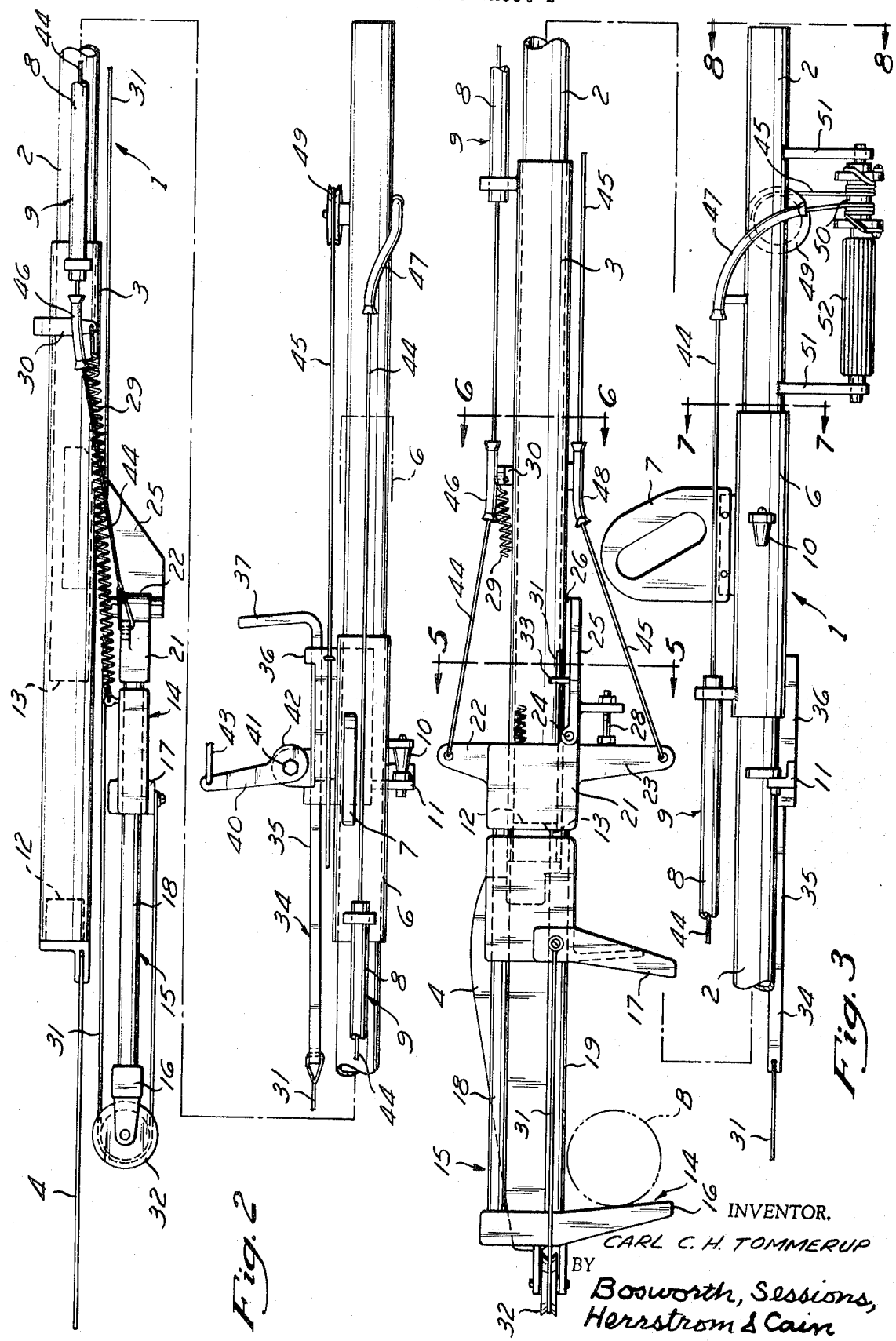

Patented Sept. 4, 1973
3,755,896
4 Sheets-Sheet 3
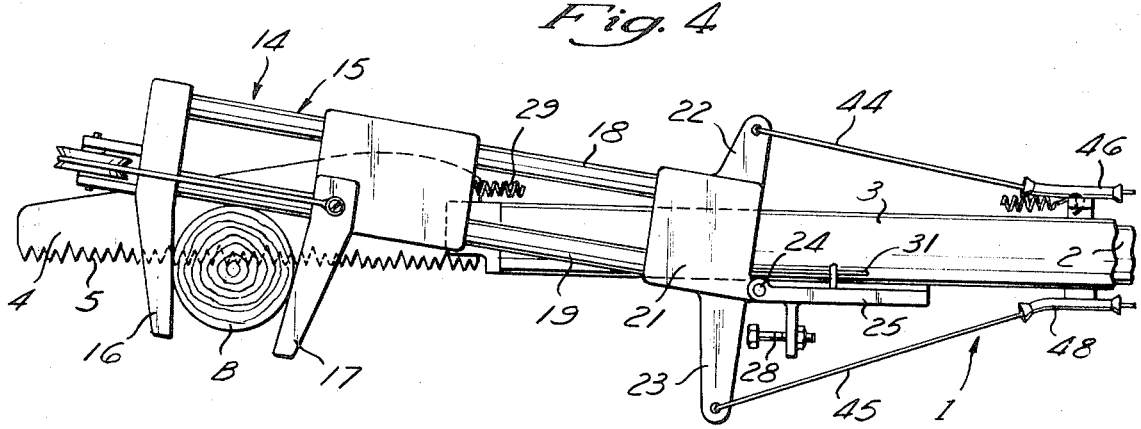
Fig. 4
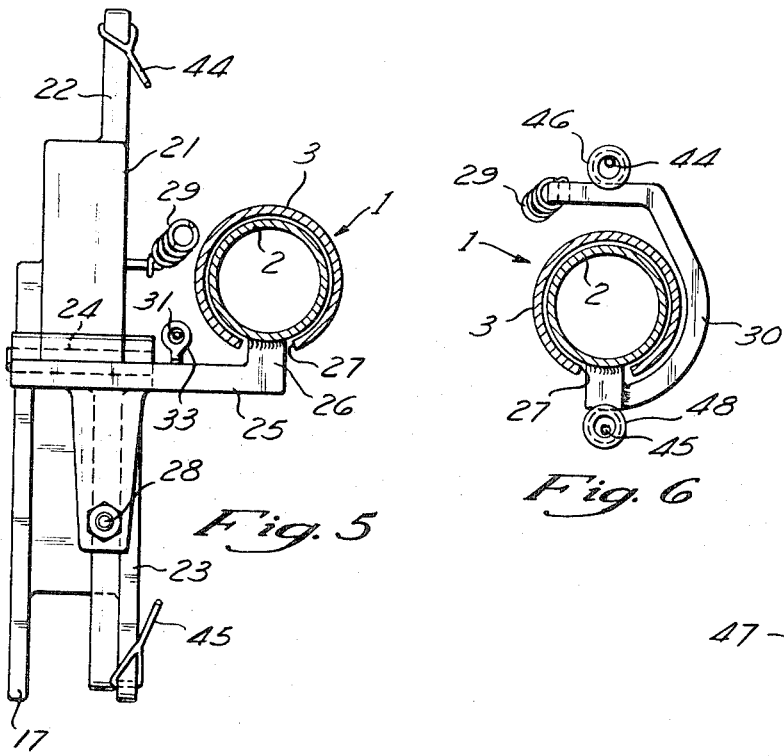
Fig. 5
Fig. 6
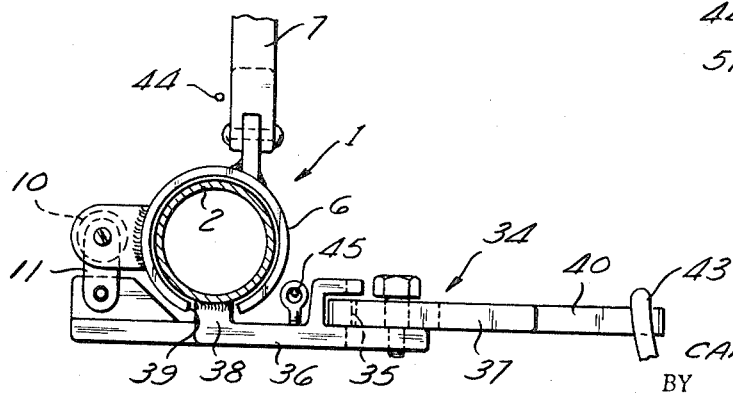
Fig. 7
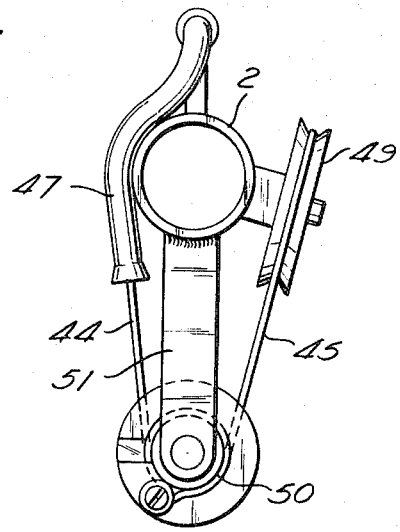
Fig. 8
INVENTOR.
CARL C. H. TOMMERUP
BY
Bosworth, Sessions,
Herrstrom & Cain
ATTORNEYS

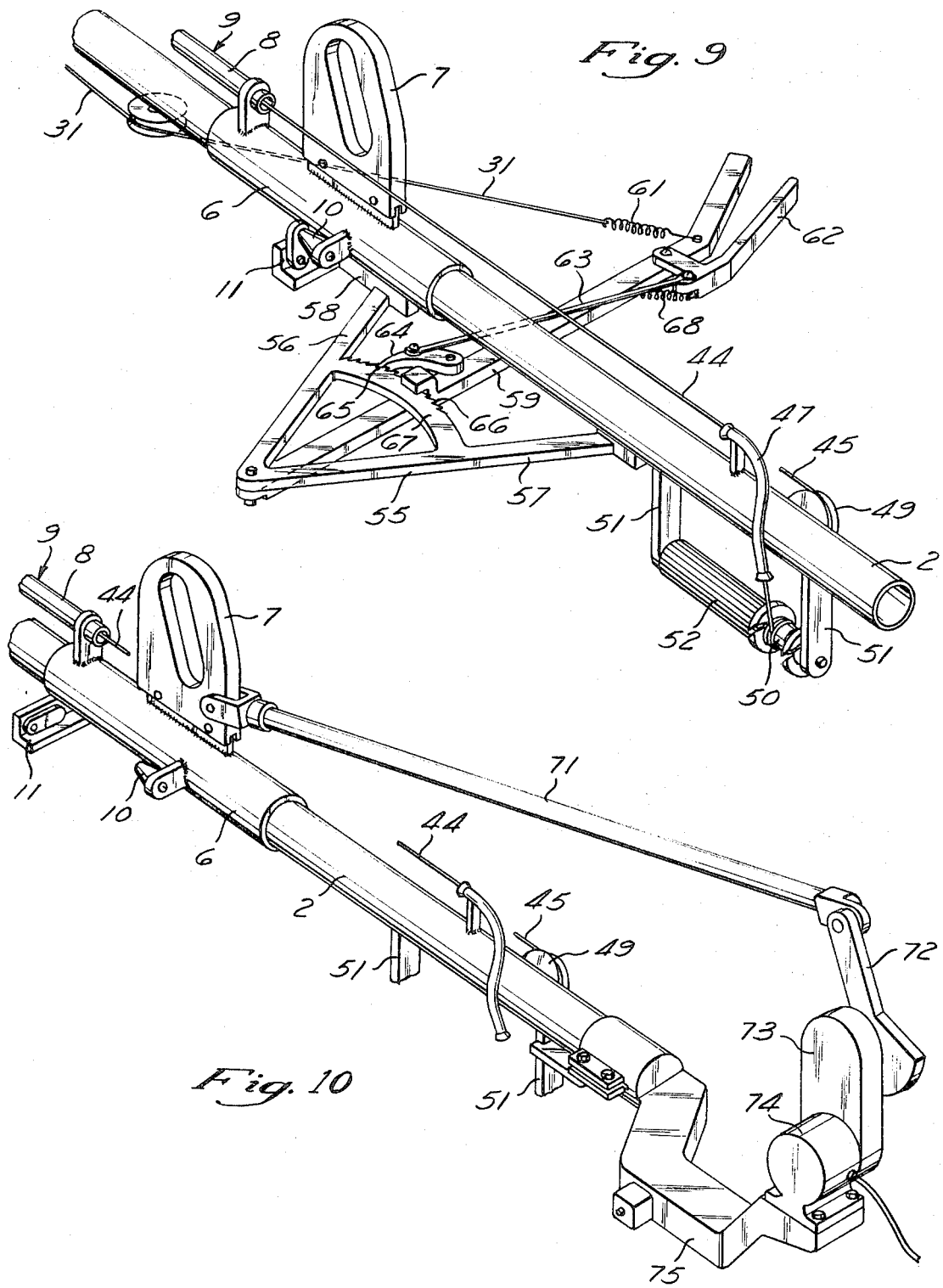

PRUNING TOOL

BACKGROUND OF THE INVENTION

This invention relates to pruning tools, more particularly to a pruning tool adapted for cutting branches of trees or shrubs at a distance from the operator, as those at a considerable distance from the ground.

Pruning tools that have heretofore been widely used for cutting branches at a distance from the ground in general comprise a pole having a hook at one end and a cutting blade mounted at the same end. The pole is raised and hook placed around the branch. The cutting blade is actuated to be forced in a single stroke to cut the branch, usually by pulling on a cord.

However, if the branch is thicker than about the thickness of a finger, it is difficult if not impossible to force the blade through the branch to cut it, and often the blade will jam. When the blade jams, it is necessary either to do a considerable amount of jerking and pulling to force the blade out, or to have a person climb a ladder to release the blade. Either alternative consumes an excessive amount of time, and the latter can involve danger.

To overcome such problems, it has been proposed to saw the branch by a saw blade immovably attached to a pole. However, in such case, the blade can saw only during one stroke, usually the downstroke. Moreover, if it is attempted to cut a branch at some distance from the trunk of a tree or a relatively rigid thick branch, so the branch to be cut is limber or flexible, then the saw blade on the pole is ineffective because the branch merely whips up and down as the blade moves. On the other hand, if such a saw arrangement is used to cut a branch that is relatively rigid, as because it is located close to the trunk, then considerable effort is required to cut the branch since the saw blade must be thick and rigid since it is a considerable distance from the operator, and the pole also must be stiff and heavy to exert the necessary lateral and longitudinal forces on the saw. Considerable physical efforts are therefore required to lift the apparatus and reciprocate the pole and the saw.

Consequently, to cut sizable branches from trees it has heretofore been necessary to use ladders and have a person climb up the ladder into the tree. When using a ladder, the worker must not only place the ladder at a secure place on the tree, but climb the ladder and saw off the limb with one hand while holding the remaining part of the limb with the other hand. This is not only time-consuming, but also provides possibilities of danger. Usually a helper is required, which adds to the expense.

SUMMARY OF THE INVENTION

By use of the pruning tool of the present invention, all or as many of the above disadvantages may be avoided, and other advantages are provided.

In general, the pruning tool of the invention comprises an elongated pole means; a cutting blade at one end of said pole means that is movable relatively to the pole means to cut a branch; means at such end of the pole means for grasping a branch the cutting blade and the clamping means being relatively movable to cause a branch grasped by the clamping means and the cutting blade to be moved relatively to each other to cause the blade to cut through said branch; and means at the other or operator end of the pole means for causing the clamping means to grasp a branch, for moving the cutting blade to cut the branch, and for moving the clamping means and the cutting blade relatively to each other to move the cutting blade and a branch grasped by the clamping means, relatively to each other to cause the blade to cut through the branch.

The clamping means or vise is preferably operable from the operator end of the pole means to grasp a branch adjacent the blade, and to be moved as the cutting progresses so as to bring the branch and blade at all times into the proper relationship for cutting.

The blade is also preferably reciprocable in a path fixed relative to the pole means, and reciprocably operated from the operator end of the pole means either manually or by power means. The pole means itself is not reciprocated, but a longitudinally extending assemblage carrying the blade is slidably mounted on the pole that moves the blade and extends to the operator end of the pole means from where it is reciprocated.

The tool may be made of such light weight that it can be easily manually handled and positioned. Clamping of the vise to the branch supports the tool and eliminates the strain and stress on the operator of physically supporting the tool during cutting of the branch. Since the tool as a whole is not reciprocated, the physical effort in reciprocating the saw blade if it is manually reciprocated is small.

The branch itself is not reciprocated or moved as the blade moves, because the vise holds it against movement.

The apparatus may be used to cut through thin or thick limbs that are within the strength capacity of the apparatus, anywhere on the tree within the limit of the length of the pole means, with a minimum of physical effort.

There is no need to use ladders and hence safety is greatly increased. One man can do the work of two or more with ladders.

BRIEF DESCRIPTION OF THE DRAWINGS

These and other features and advantages of the invention will become apparent from the following description of preferred embodiments in connection with the accompanying drawings in which:

FIG. 2 is a plan view to a scale considerably larger than that of FIG. 1 of the upper or cutting end of the tool and the lower or operator end of the tool, these ends being off-set in the figure to conserve space on the sheet, the reciprocable unit including the saw blade being at the forward end of its reciprocatory path, and the vise being open its maximum amount;

FIG. 3 is a side elevation of the upper or cutting end of the tool and the lower or operator end of the tool, these two portions being offset to conserve space on the sheet, the reciprocable unit being shown at the rear end of its reciprocatory path, and the vise being completely open;

FIG. 4 is a side elevation to the same scale as FIGS. 2 and 3 showing the cutting end of the tool in operation in cutting a branch;

FIG. 5 is a section along line 5—5 of FIG. 3 and to a larger scale;

FIG. 6 is a section along line 6—6 of FIG. 3 and to the same scale as FIG. 5;

FIG. 7 is a section along line 7—7 and to the same scale;

FIG. 8 is a section along line 8—8 and to the same scale;

FIG. 9 is a perspective approximately to the same scale as FIGS. 2 and 3 of the lower or operator end of a different embodiment, showing a different means for operating the vise, to close and open it; and FIG. 10 is a perspective, approximately to the same scale as FIGS. 2, 3 and 9 showing another embodiment of the invention comprising means for reciprocating the cutting blade by power means.

DESCRIPTION OF THE PREFERRED EMBODIMENT OF THE INVENTION

Figure 1:
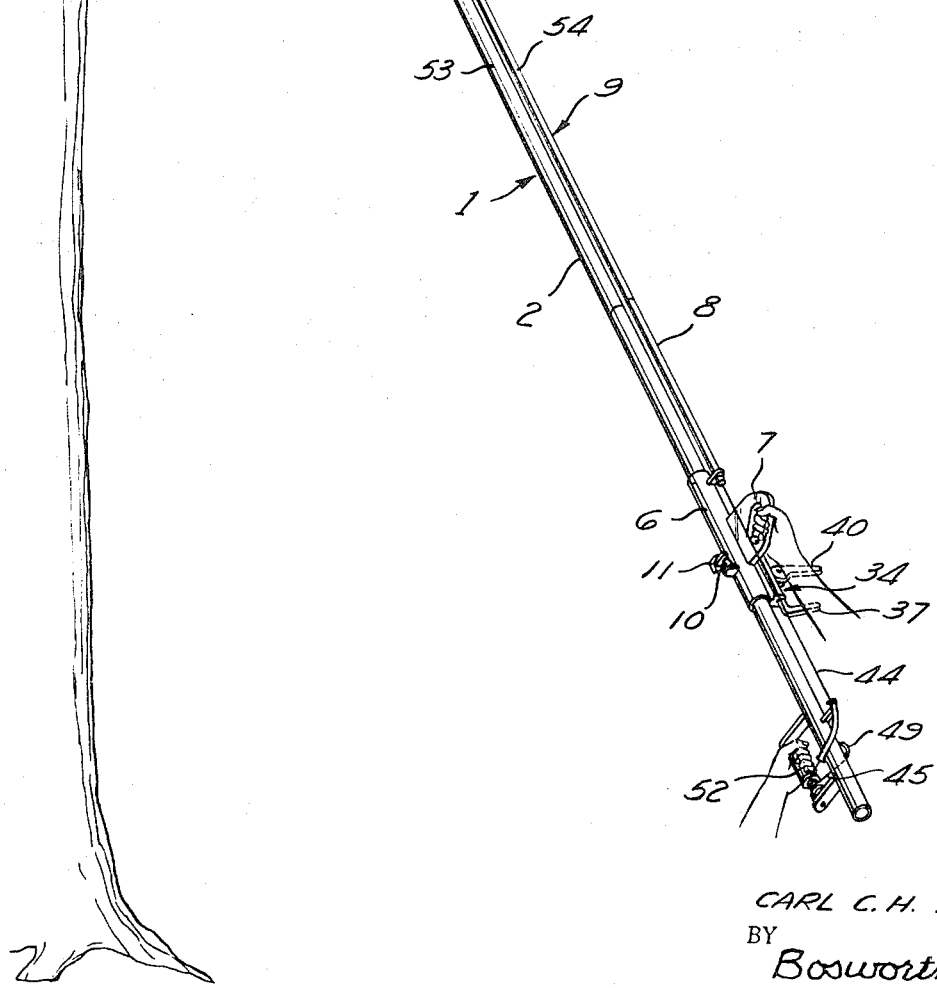
FIG. 1 is a perspective showing the cutting tool in operation, the cutting blade being manually reciprocable.

The pruning tool shown in FIGS. 1 to 8 inclusive comprises elongated pole means 1, comprising an elongated body 2 of substantial length to provide the desired reach by the tool; the body 2 is preferably formed of light weight aluminum tubing of sufficient strength for the purpose for which the tool is used. Body 2 slidably carries on its exterior surface at its upper or cutting end a tubular reciprocable member 3, to the outer end of which a saw blade 4, having teeth 5, is rigidly fixed, preferably by demountable means. At the lower or operating end of pole means 1, there is slidably reciprocably mounted on body 2 another tubular reciprocable member 6. This member 6 rigidly carries an actuating handle 7. Reciprocable members 3 and 6 are rigidly connected together by a member 8 preferably taking the form of a tube.

A reciprocable unit 9 is thus formed by the members 3, 6, 7 and saw blade 4. This unit can be reciprocated on the tubular body 2 by an operator grasping and moving the handle 7 back and forth. The stroke of unit 9 forward toward the cutting end of the pole means is limited by contact of a bumper 10 on member 6, preferably rubber faced, with a lug 11 fixed on elongated body 2 (FIG. 2); and the rearward stroke of member 8 is limited by contact of bumper 12, preferably rubber faced, inside of member 3, with the end 13 of body 2 (FIG. 2). Thus even though the pole is stationary, the saw blade 4 is reciprocated in a path fixed with respect to the pole means to provide cutting action.

The illustrated pruning tool also comprises a vise 14 comprising a frame 15 carrying fixed and movable jaw members 16, 17. Frame 15 comprises two parallel spaced elongated members 18 and 19 to which fixed jaw member 16 is rigidly connected and on which the movable jaw member 17 slides. Members 18 and 19 are rigidly connected to a supporting member 21 forming part of frame 15 and having transversely extending lugs 22 and 23. Member 21 is pivotally connected by pin 24 to a bracket 25 rigidly fixed to the upper or cutting end of body 2, as by welding. This bracket has a narrow web portion 26 that extends through a slot 27 (FIG. 5) in reciprocable member 3 carrying saw blade 4. This slot not only permits the bracket to extend through the member 3, but also in combination with the web portion 26 forms a guide means that prevents the reciprocable member and unit 9 from turning on body 2 about its axis, and hence turning the saw blade from its desired fixed path of reciprocation. Bracket 25 carries an adjusting screw 28 as stop means to bear against the lug 23 to limit tilting of the vise in the direction away from the cutting edge of the saw blade (FIGS. 3,4).

Means is provided for actuating movable jaw member 17 of the vise to cause it to grasp and release a branch, and means is also provided to tilt the vise relative to the saw blade as shown in FIG. 4, both of these means being operated from the lower or operator end of the tool.

The means for actuating the movable jaw comprises a tension spring 29, connected to the movable jaw member 17 and to a bracket 30 fixed on elongated body 2 and extending through slot 27 of member 3, to bias the jaw member 17 toward its open position (FIGS. 2, 3, 5, 6). A flexible unstretchable cable 31 is fixed to the movable jaw member to move the jaw member against the tension of the spring 29 toward the closed position, this cable being shown as passing around a pulley 32 mounted on the fixed jaw member 16 of the vise, and rearwardly through an eye 33 mounted on bracket 25 toward the lower or operator end of the pole means shown in FIGS. 2 and 3, where it is connected to actuating member 34. The eye 33 prevents cable 31 from slackening or entangling with other parts when the vise is tilted. Member 34 comprises a longitudinal portion 35 of square cross section slidably but non-rotatably mounted in a bracket 36 fixed to body 2, and a laterally projecting handle 37 to move actuating member 34 longitudinally of pole means 1. Bracket 36 also has a web portion 38 extending through an elongated slot 39 (FIG. 7) in lower reciprocable member 6. Slot 39 and the web portion 38 provide guide means preventing rotation of member 6 and reciprocable unit 9 about member 2.

When drawn rearwardly by hand, actuating member 34 pulls cable 31 and draws movable jaw member 17 in its closing direction, so that the vise can clamp or grasp a branch B (FIGS. 3 and 4) between its movable and fixed jaw members. Actuating member 37 may be secured in the position in which jaw member 17 clamps the branch, by a locking member 40 pivotally mounted about member 41 on a bracket 36, and having a cam portion 42 so shaped that when member 40 is turned toward the lower end of pole means 1 in locking position, the cam surface clamps the actuating member 34 in the branch clamping position in which it is located. When locking member 40 is manually turned to the release position shown in full lines in FIG. 2, it releases actuating member 34, so that spring 29 of vise 14 can pull its movable jaw member 17 to its maximum open position, the spring being strong enough for this purpose. Preferably, a cord 43 is fastened to the end of member 40 for convenience in locking.

The vise as a whole can, by the following means, be tilted relative to the path of travel of the saw blade 4 and relative to the axis of the body 2, to permit the branch held by the vise and the cutting edge of the saw blade to move relatively toward each other to feed the saw into the branch to cut it, as shown in FIG. 4. The illustrated tilting means comprises flexible unstretchable cables 44 and 45 respectively fixed to the outer ends of lugs 22 and 23. Cable 44 passes through guide 46 and tubular member 8 constituting the rigid connection between upper and lower reciprocating members 3 and 6, member 8 thus acting as a long guide for the cable; the cable then passes to the lower end of the pole means through curved guide 47. The other cable 45 passes through guide 48 and around pulley 49 on body 2 at the lower end of the pole means. Cables 44 and 45 thus pass to and are wound in opposite directions on a winch drum 50 rotatable mounted on brackets 51 fixed to body 2. Drum 50 is adapted to be rotated in either direction about axis extending longitudinally of body 2, by a handle 52 connected to the winch. If the handle is rotated in one direction the vise 14 tilts as a whole in one direction about pivot pin 24; if the handle is rotated in the other direction, the vise tilts in the other direction, the tilting being in a path generally parallel to the path of reciprocation of blade 4 and of the axis of pole means 1 and body 2. As indicated, tilting of the vise away from the cutting edge of the saw blade is limited by stop 28.

The length of the tool may be made adjustable if desired, by providing inserts 53 and 54 (FIG. 1) of various desired lengths in the body 2 and tube 8; these inserts can be rigidly secured in place by known means; necessary adjustments to the length of the vise closing and tilting cables can also be made by known means, as by addition or removal of clamped lengths of cable corresponding to the lengths of members 53 and 54.

The mode of operation of the above illustrated apparatus, assuming a right-handed operator, is as follows, being illustrated by FIGS. 1, 2 and 3.

The operator first insures that the vise 14 is in its straight or untilted position and open; if necessary he turns the handle 52 in the proper direction to cause the vise frame 15 to bear against stop 28, and releases the actuating member 34.

The pruning tool is then manually raised and its vise 14 placed on the branch at the location where the saw 4 will make the desired cut. Preferably the tool is arranged so that the vise will engage the branch on the side of the saw at which the remaining uncut portion of the branch will be. The tool now hangs from the branch and the operator no longer needs to support its weight.

Next, the operator shifts his left hand to the drum handle 52 without letting the drum turn. With his thumb and forefinger of his right hand he loosely holds cord 43 of locking member 40, while the remaining three fingers firmly grasp the vise closing handle 37 of actuating member 34. Handle 37 is then pulled toward the lower or operator end of the tool until the vise closes on the branch to grasp it, after which the operator then pulls the cord 43 to engage the cam portion 42 of locking member 40 into locking position on portion 35 of actuating member 34. It is not necessary to use great force to close the vise; indeed, during the sawing operation the vise rotates slightly around the branch so that tight clamping is undesirable.

While still holding drum handle 52 securely in his left hand, the operator begins sawing with his right hand by grasping the blade actuating handle 7 and reciprocating the reciprocatory unit 9 to the limits of its stroke on tubular body 2. The wood of the branch and the cutting edge of the blade are fed toward each other by turning the winch drum handle 52 so that cable 44 is tightened and cable 45 is slackened. Most if not all of the force for feeding the saw blade and wood together is actually supplied from the weight of the tool, so that the rate of feed of the saw into the wood cut is controlled by holding back on the drum handle to prevent a too-rapid rate of feed. Usually, only a fraction of a drum revolution is required to feed through a branch of even substantial diameter. As is the case with hand sawing of wood, there should be a slow rate of feed of the saw into the wood until a cut has been well established in order to prevent the saw blade from veering sidewise.

When the cut has been completed, and the cut portion of the branch has dropped off, the locking member 40 is released merely by moving it to its upright position, and the vise springs open.

If the sawed-off branch should get caught in the lower branches of the tree as it falls, it may be effectively grasped and extricated by grasping it with the vise of the tool.

FIG. 9 illustrates another means for closing the vise and releasably locking it in its closed position. All other parts of the apparatus are the same and hence bear the same reference numerals as in the previous embodiment.

In this embodiment of FIG. 9, there is a laterally extending bracket 55 having two divergent legs 56 and 57 fixed to body 2 at spaced locations, a leg 56 being fixed to a web portion 58 that extends through the previously mentioned slot 39 in reciprocable member 6. An actuating arm 59 is pivotally mounted on bracket 55 and is connected to actuating cable for closing the vise. Preferably, a tension 61 is between the cable and arm to prevent excessive tension in the cable.

An arm locking mechanism comprises a trigger 62 pivotally mounted on arm 59 and connected by a short length of rod 63 to a pawl 64 pivotally mounted on the arm and having a pointed end 65 that can engage teeth 66 on an arcuate bracket portion 67 extending between the bracket legs. The arrangement is such that when the arm 59 is manually pulled toward the lower end or operating end of the tool to pull cable 31 to close the vise, the pawl 64 slides over teeth 66. When the arm has reached its maximum position, the pawl engages the teeth and retains the arm and the cable in the vise closing position.

When it is desired to release the vise, the trigger 62 is merely pressed toward the arm 59 to lift the pawl out of the tooth with which it is engaged and permit the arm to be moved toward the vise-releasing position. Preferably a tension spring 68 connected between the arm and the trigger member biases the trigger member so it does not tend to release the pawl.

FIG. 10 illustrated another embodiment utilizing power means for actuating the saw blade. Although not shown in this embodiment either of the previously disclosed means could be used for opening and closing the vise. Similarly, although no means is shown for tilting the vise, the previously described means can be used. All other parts corresponding to those of the previous embodiments bear the same reference characters.

In the embodiment of FIG. 10, however, the reciprocable assembly 9 on which the saw blade 4 is mounted is reciprocated lengthwise of the tubular body 2 by a link 71 pivotally connected at one end to the handle 7 and at the other end to a crank arm 72 that is rotated through a gearbox 73 from an electric motor 74 mounted on a bracket 75 clamped to the end of the tubular body 2. As the electric motor rotates it rotates the crank arm which through the link reciprocates the reciprocatory unit that moves the saw blade. In this embodiment, of course, the saw blade can also be reciprocated manually if desired. Of course other power means, such as an internal combustion engine or hydraulic or compressed air motor can be used.

From the above, it is apparent that the present invention provides a pruning tool that can be made to be light and simple to operate, that can overcome the problems involved in use of prior pruning tools, and that makes possible the safe and rapid cutting of branches even of large diameters at a distance from the operator who may remain on the ground.

Modifications other than those indicated above may be made without departing from the invention.

It is intended that the patent shall cover, by suitable expression in the appended claims, the features of novelty that reside in the invention.

I claim:

1. Pruning apparatus comprising pole means; a reciprocable unit mounted on said pole means for reciprocation relative to said pole means, said unit being mounted so it does not rotate about the axis of said pole means and so it extends from near one end of said pole means to near the other end of said pole means, said unit including a cutting blade mounted on said unit at one end of said pole means; means near the other end of said pole means for reciprocating said unit; vise means non-reciprocably mounted on said pole means adjacent said cutting means, said vise means having movable jaw means adapted to be moved to a position to grasp a branch adjacent said cutting means, said vise means being movably mounted on said pole means so that a branch grasped by said vise means is fed into cutting relation to said cutting means; means near the other end of said pole means for moving said movable jaw means of said vise means to branch grasping position; and means near the other end of said pole means for moving said vise means relative to said cutting means to cause a branch grasped by said vise means to be fed in cutting relation to said cutting means to permit said branch to be cut through.

2. The apparatus of claim 1 in which said cutting means is a blade reciprocable relatively to said pole means in a fixed path generally parallel to the axis of said pole means.

3. The apparatus of claim 1 in which said vise means is tiltable relatively to the axis of said pole means.

4. The apparatus of claim 1 in which said cutting means is a blade reciprocable in a fixed path generally parallel to the axis of said pole means, and in which said vise means is mounted on said pole means adjacent to the path of reciprocation of said cutting blade and is tiltable with respect to the axis of said pole means in a path generally parallel to the path of reciprocation of said cutting means.

5. The apparatus of claim 1 comprising means for locking said jaw means of said vise means in branch grasping position, said locking means being actuatable from the end of the pole means remote from said vise means.

6. The apparatus of claim 1 in which said vise means comprises a frame, jaw means fixed on said frame, jaw means movably mounted on said frame and adapted to be moved between branch grasping and open positions, and means for biasing said movable jaw means toward its open position; and said apparatus comprises means for moving said movable jaw means towards branch grasping position comprising cable means connected to said movable jaw means and means at a location near the end of said pole means remote from said clamping means and for pulling said cable means and means for relatively holding said pulling means in a position that holds said movable jaw means in branch grasping position.

7. The apparatus of claim 1 in which said vise means is tiltably mounted on said pole means about a pivot location; and in which said means for moving said vise means to feed a branch into cutting relation comprises spaced cables connected to said vise means on opposite sides of said pivot location on said pole means, and rotatable winch means adjacent the end of the pole means opposite that carrying said cutting blade and vise means to which said cables are connected and operable so that as the winch means is rotated in one direction one of the cables is tightened and the other is loosened, whereby by rotation of the winch means the direction and angle of tilt of said vise means can be controlled from the said end of said pole means.

8. The apparatus of claim 6 in which said pulling means is releasably held in a position that holds said movable jaw means in branch-grasping position.

* * * * *